US012772922B2

(12) United States Patent
Dix et al.

(10) Patent No.: US 12,772,922 B2
(45) Date of Patent: Oct. 27, 2026

(54) SPOKE GAUGE WHEEL FOR AGRICULTURAL IMPLEMENT

(71) Applicant: Kinze Manufacturing, Inc., Williamsburg, IA (US)

(72) Inventors: Richard R. Dix, Williamsburg, IA (US); Vaughan Stevenson, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 149 days.

(21) Appl. No.: 18/794,148

(22) Filed: Aug. 5, 2024

(65) Prior Publication Data

US 2025/0040470 A1 Feb. 6, 2025

Related U.S. Application Data

(60) Provisional application No. 63/517,651, filed on Aug. 4, 2023.

(51) Int. Cl.
*A01B 27/00* (2006.01)
*A01C 5/06* (2006.01)

(52) U.S. Cl.
CPC .............. *A01C 5/064* (2013.01); *A01B 27/00* (2013.01)

(58) Field of Classification Search
CPC .. A01C 5/064; A01C 5/06; A01C 7/00; A01C 7/20; A01C 7/08; A01B 27/00; G01B 11/25; G06T 7/00
USPC .......................................................... 111/163
See application file for complete search history.

(56) References Cited

U.S. PATENT DOCUMENTS

| | | | | |
|---|---|---|---|---|
| 5,878,678 | A * | 3/1999 | Stephens | A01C 5/06 111/139 |
| 2012/0104835 | A1* | 5/2012 | Waldner | B60B 3/10 301/64.101 |
| 2017/0208734 | A1* | 7/2017 | Weisz | A01C 7/203 |
| 2022/0117147 | A1* | 4/2022 | Collin | A01C 5/064 |
| 2023/0389463 | A1* | 12/2023 | Armoa | A01C 7/006 |
| 2024/0393107 | A1* | 11/2024 | Kise | A01B 63/111 |

* cited by examiner

*Primary Examiner* — Nicole Coy
*Assistant Examiner* — Douglas S Wood
(74) *Attorney, Agent, or Firm* — McKee, Voorhees & Sease, PLC

(57) ABSTRACT

Agricultural implements, such as planting and seeding implements, often include depth setting and maintaining components. This may include gauge wheels, which are set to attempt to keep furrow openers situated to open a furrow of desired depth for placement of the seeds through a field. The gauge wheels can include spokes with serrations added along the spokes. The serrated spokes will interact with trash in the field and the serrated spokes will break down the trash as the gauge wheel rotate, thus reducing the likelihood of buildup and plugging of the gauge wheels of the implement. This will allow an operator to minimize stoppage due to trash buildup and plugging in the row units to aid in finishing planting within the desired timeframe.

20 Claims, 9 Drawing Sheets

SPOKE GAUGE WHEEL FOR AGRICULTURAL IMPLEMENT

CROSS REFERENCE TO RELATED APPLICATIONS

This application claims priority under 35 U.S.C. § 119 to provisional patent application U.S. Ser. No. 63/517,651, filed Aug. 4, 2023. The provisional patent application is herein incorporated by reference in its entirety, including without limitation, the specification, claims, and abstract, as well as any figures, tables, appendices, or drawings thereof.

TECHNICAL FIELD

The present disclosure relates generally to the field of agricultural implements. More particularly, but not exclusively, the disclosure relates to components of agricultural implements, such as those with ground engaging components, to aid in the performance of the implements for various environmental conditions.

BACKGROUND

The background description provided herein gives context for the present disclosure. Work of the presently named inventors, as well as aspects of the description that may not otherwise qualify as prior art at the time of filing, are neither expressly nor impliedly admitted as prior art.

Agricultural implements come in various forms and have different components that are tailored to their intended use in the fields. Some non-limiting examples of implements include seeding, planting, or other ground engaging or application purposes (e.g., spraying, applying, treating, tilling, plowing, etc.). For some implements, the ground engaging elements of the implements have high importance.

Seeding and planting implements generally include creating a furrow in a field and then applying or placing a particulate material, i.e., seed, in the furrow. The furrow is then closed. The main difference between seeding and planting applies to volume and precision. Seeding, also known as drilling, is often a high volume application of seeds in a furrow to plant as many plants as possible in an area. Planting, also referred to as precision planting, involves planting seeds as predetermined distances from one another at desired depths in the field. In both instances, agronomics and other studies aid in determining the proper volume, spacing, depth, and other considerations for placing the seeds in the field.

To aid in obtaining and maintaining the desired depth in fields, many implements include depth setting and maintaining components. The depth setting components include furrow openers (discs, blades, knives, or the like) downforce applicators, sensors, depth adjustments members, and the like, which are used in conjunction with one another to aid in opening the furrow in the ground. Depth maintaining elements include gauge wheels or other components that can "ride" on the field to aid in keeping the depth opener at the desired depth as the implement moves through a field with varying topographies, obstructions, and general makeup. The gauge wheels are connected to the depth setting mechanisms to attempt to hold the furrow opener relative to the ground to create a consistent furrow of desired depths.

One issue that arises with such implements involves leftover residue and prior crop portions in the field, which is sometimes referred to as trash. This can include previous years' stalks, leaves, stems, or other portions of the crop, as well as anything that is blown into a field. The trash can become built up in portions of the implements, such as in spokes of gauges wheels. While row cleaners and other add-ons have been included to help clean the trash, excess buildup of trash can plug the row units, which cause delays for the farmer to have to stop and clean out the rows lest they reduce the conditions for planting in a desired manner (i.e., population, spacing, depth, and other agronomic factors).

Traditionally, plowing or tilling the field has been a way to set up a field prior to planting or seeding to remove as much trash as possible, which mitigates the trash building up in the row unit components. While this does improve conditions, it is dependent on many factors, including weather conditions, timing, equipment, etc. As planting seasons are tight in time, this may be rushed or otherwise skipped.

In addition, one development that has taken on more use in recent years includes no-till farming. No-till farming (also known as zero tillage or direct drilling) is an agricultural technique for growing crops or pasture without disturbing the soil through tillage. No-till farming decreases the amount of soil erosion tillage causes in certain soils, especially in sandy and dry soils on sloping terrain. Other possible benefits include an increase in the amount of water that infiltrates into the soil, soil retention of organic matter, and nutrient cycling. Leaving the previous crop parts in the field is said to improve growing conditions for crops.

However, no-till farming greatly increases the amount of trash in a field. In practice, the field is generally left untreated after a previous year's harvest, and thus, there are many stalks, leaves, and other crop components in a field or pasture for the following planting season. The increased amount of trash leads to greater instances of plugging of components of the implements, such as in front of or in the middle of the implement. This includes the depth setting and maintaining components, such as the gauge wheels.

Thus, there exists a need in the art for systems and/or apparatus that attempt to address instances of trash build up for implements and/or row units on the implements in a manner to reduce excess trash build up, including plugging.

SUMMARY

The following objects, features, advantages, aspects, and/or embodiments are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present disclosure to improve on or overcome the deficiencies in the art.

It is a further object, feature, and/or advantage of any of the aspects of any of the embodiments disclosed herein to mitigate plugging caused by trash buildup in row unit components.

It is still yet a further object, feature, and/or advantage of any of the aspects of any of the embodiments disclosed herein to improve performance of agricultural row units, including agricultural planting implements.

It is another further object, feature, and/or advantage of any of the aspects of any of the embodiments disclosed herein to improve performance of agricultural planting implements in environments including no-till planting fields.

The systems and/or apparatus disclosed herein can be used in a wide variety of applications. For example, while agricultural planting implements have been included, it should be appreciated that any agricultural implement, including spraying, tilling, plowing, harvesting, or the like could include features disclosed which would improve performance.

It is preferred that the apparatus be safe, cost effective, and durable. For example, the apparatus can be adapted to resist excessive heat, static buildup, corrosion, and/or mechanical failures (e.g., cracking, crumbling, shearing, creeping) due to excessive impacts and/or prolonged exposure to tensile and/or compressive forces acting on the apparatus.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the apparatus.

Methods can be practiced which facilitate use, manufacture, assembly, maintenance, and repair of [an apparatus] which accomplish some or all of the previously stated objectives.

The apparatus can be incorporated into systems or kits which accomplish some or all of the previously stated objectives.

According to some aspects of the present disclosure, an agricultural implement comprises a hitch; at least one toolbar at a distal end of the hitch, said toolbar extending generally transverse to the hitch; and a plurality of row units operatively connected to the toolbar, each of the plurality of row units comprising a depth setting system comprising a pair of gauge wheels connected to a depth setting member, wherein the pair of gauge wheels each comprise a rim and an outer pliable wheel, with the rim comprising a plurality of spokes with serrations along the spokes.

According to at least some aspects of some embodiments disclosed, the rim of each gauge wheel comprises three equally spaced spokes.

According to at least some aspects of some embodiments disclosed, the serrations are formed on both sides of the plurality of spokes.

According to at least some aspects of some embodiments disclosed, the rim comprises a unitary component with the plurality of spokes and an outer periphery to hold the pliable wheel.

According to at least some aspects of some embodiments disclosed, the rim comprises an outer periphery member and the plurality of spokes operably attached to the outer periphery member.

According to at least some aspects of some embodiments disclosed, the pliable wheel comprises a rubber material on the periphery of the rim.

According to at least some aspects of some embodiments disclosed, the implement further comprises a sensor connected to the pair of gauge wheels and the depth setting member to provide feedback in the form of force applied via the gauge wheels.

According to at least some aspects of some embodiments disclosed, the pair of gauge wheels are oriented at an angle relative to a direction of travel for the agricultural implement, with a forward location of the pair of gauge wheels closer to one another than a rear location of the pair of gauge wheels.

According to at least some aspects of some embodiments disclosed, the implement further comprises a residue wheel connected to each row unit to aid in breaking up trash prior to the pair of gauge wheels.

According to some additional aspects of the present disclosure, an agricultural row unit comprises a frame; a furrow opener; and a depth setting system connected to the frame and furrow opener to control the depth of furrow created by the furrow opener, the depth setting system comprising a pair of gauge wheels comprising a spoked rim with one or more spokes, wherein each of the spokes comprising a serrated edge.

According to at least some aspects of some embodiments disclosed, wherein each of the spokes of the gauge wheel comprises serrations on both sides of the spokes.

According to at least some aspects of some embodiments disclosed, the one or more spokes comprises three, equally spaced spokes about a rotational axis.

According to at least some aspects of some embodiments disclosed, the gauge wheel further comprises a pliable material about the outer periphery of the rim.

According to at least some aspects of some embodiments disclosed, the pliable material comprises rubber.

According to at least some aspects of some embodiments disclosed, the row unit further comprises a seed meter connected to the frame.

According to at least some aspects of some embodiments disclosed, the row unit further comprises a sensor connected to the pair of gauge wheels and the depth setting member to provide feedback in the form of force applied via the gauge wheels.

According to some additional aspects of the present disclosure, a depth setting system for an agricultural row unit comprises a furrow opener; one or more gauge wheels; a depth setting member connected to the one or more gauge wheels, wherein the depth setting member and the one or more gauge wheels set the depth of furrow created by the furrow opener; and wherein the one or more gauge wheels comprise a rim with one or more spokes, and each of the one or more spokes comprising a serrated edge.

According to at least some aspects of some embodiments disclosed, the one or more gauge wheels comprise a pair of gauge wheels on opposite sides of the agricultural row unit.

According to at least some aspects of some embodiments disclosed, the one or more spokes of the rim of the one or more gauge wheels comprise serrations on more than one edge.

According to at least some aspects of some embodiments disclosed, the depth setting system further comprises a sensor connected to the one or more gauge wheels and the depth setting member to provide feedback in the form of force applied via the one or more gauge wheels.

These and/or other objects, features, advantages, aspects, and/or embodiments will become apparent to those skilled in the art after reviewing the following brief and detailed descriptions of the drawings. The present disclosure encompasses (a) combinations of disclosed aspects and/or embodiments and/or (b) reasonable modifications not shown or described.

BRIEF DESCRIPTION OF THE DRAWINGS

Several embodiments in which the present disclosure can be practiced are illustrated and described in detail, wherein like reference characters represent like components throughout the several views. The drawings are presented for exemplary purposes and may not be to scale unless otherwise indicated.

Figure 1:
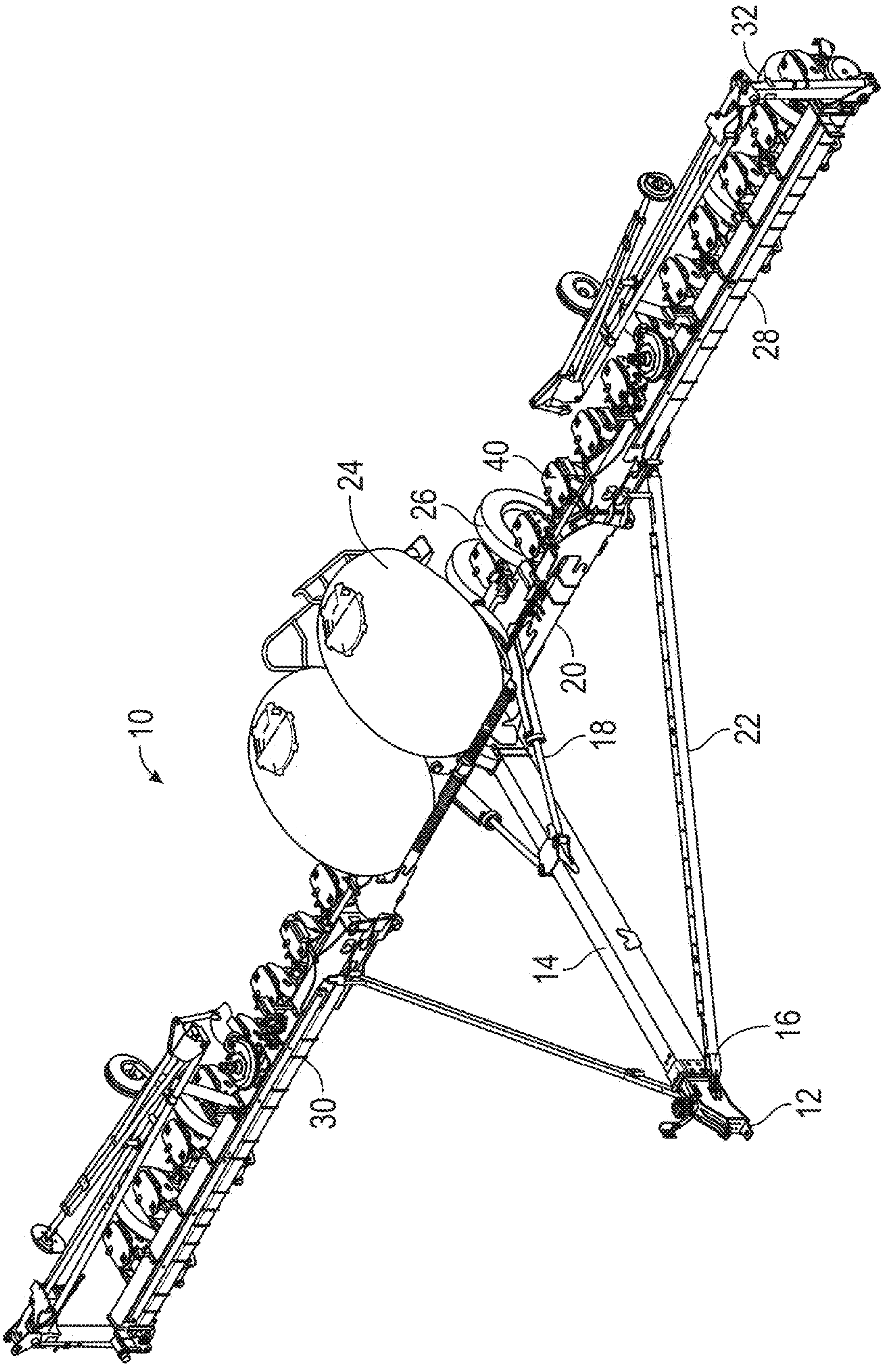
FIG. 1 is a perspective view of an agricultural planting implement.
Figure 2:
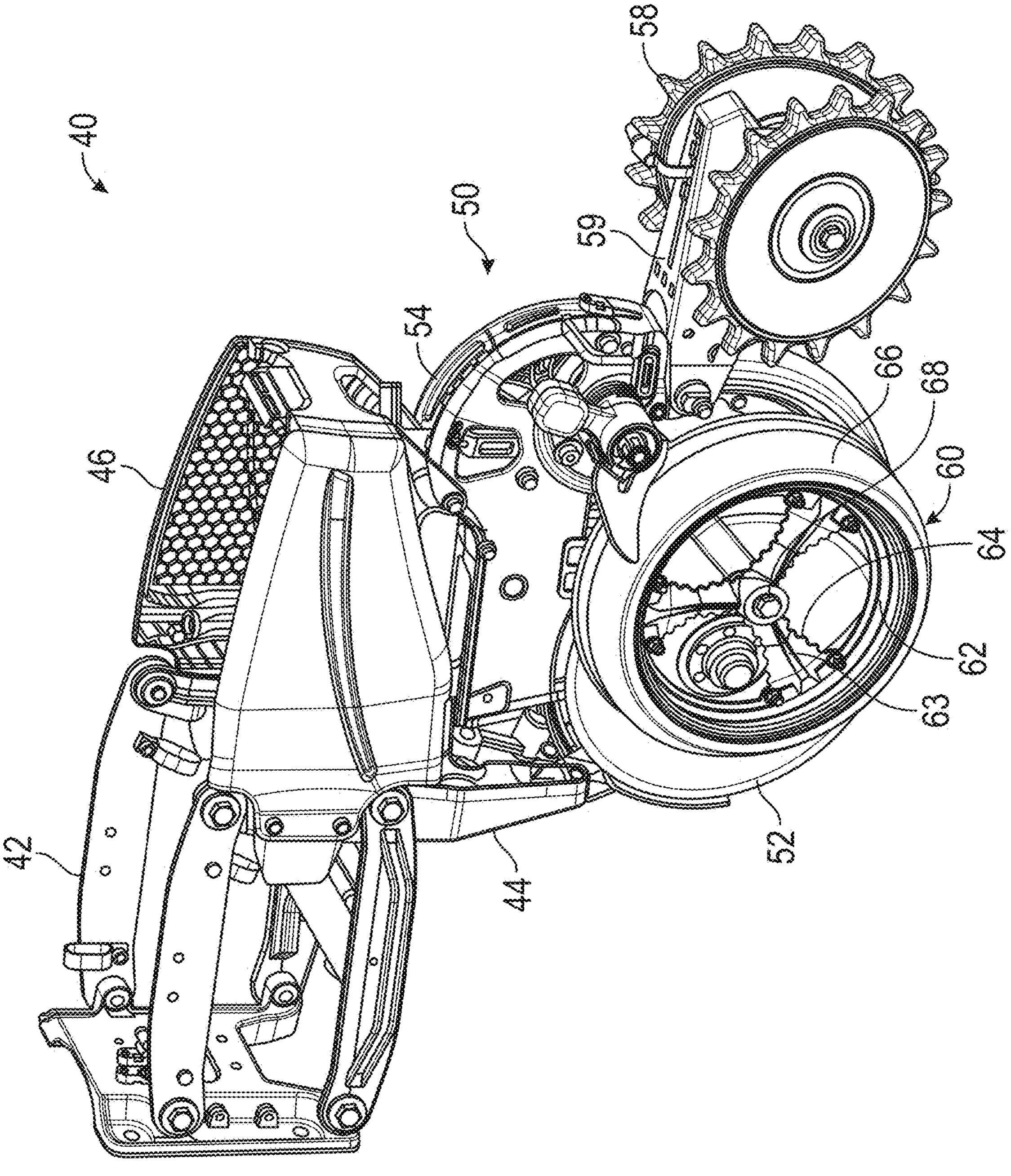
FIG. 2 is a rear perspective view of a row unit for use with a planting implement such as shown in FIG. 1 and including aspects and/or embodiments of the present disclosure.
Figure 3:
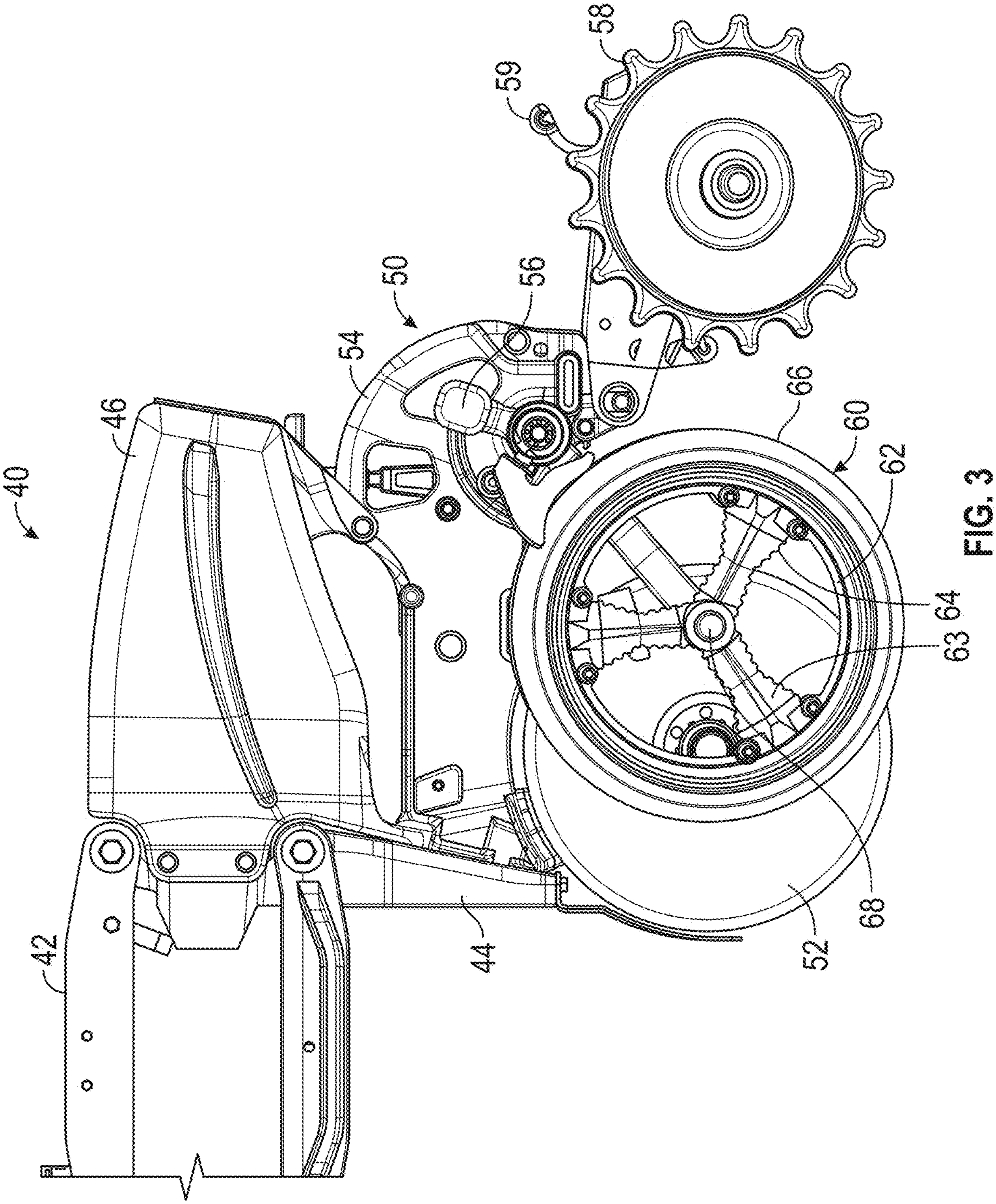
FIG. 3 is a side elevation view of the row unit of FIG. 2.
Figure 4:
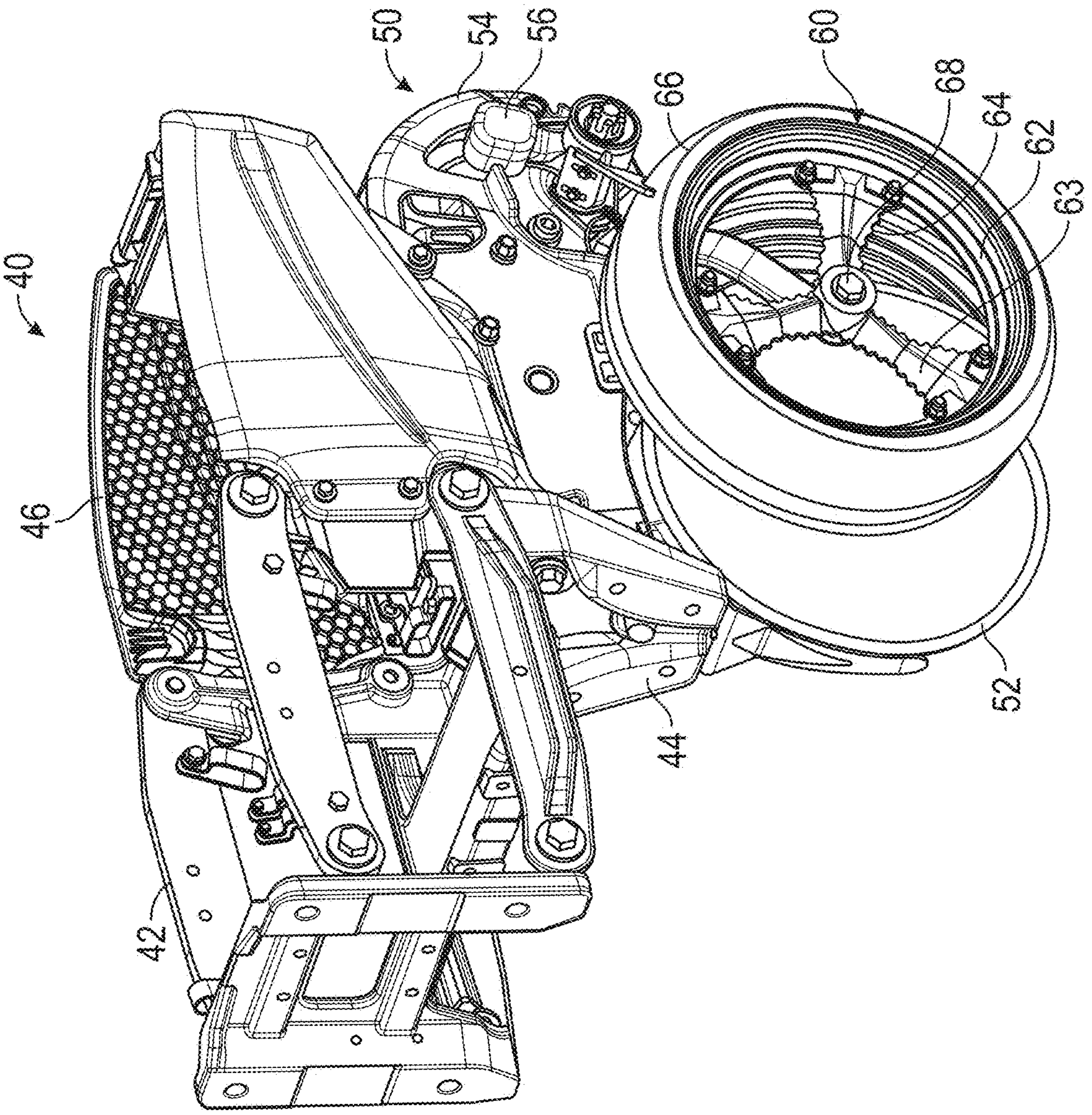
FIG. 4 is a front perspective view of the row unit of FIG. 2.
Figure 5:
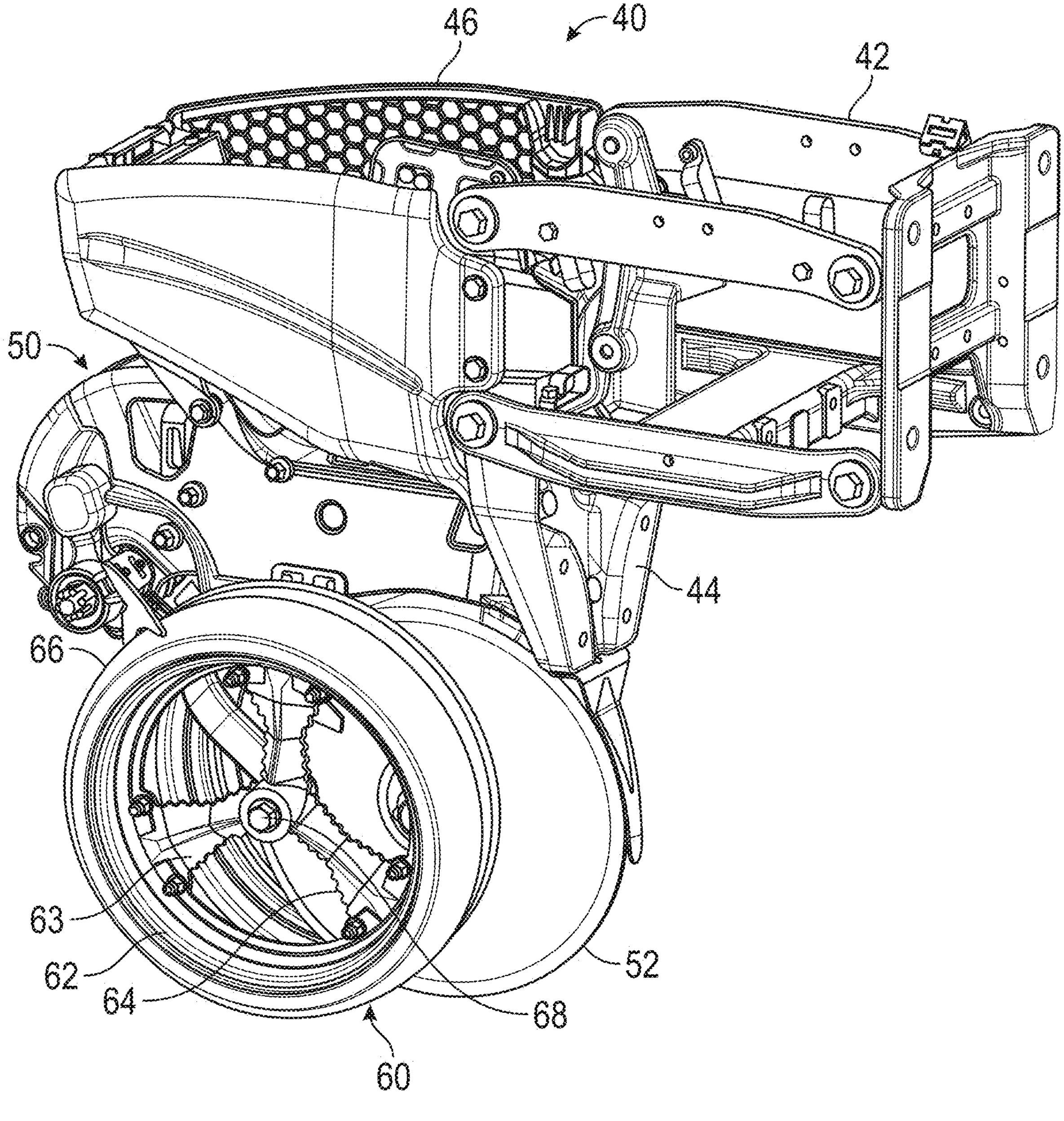
FIG. 5 is another front perspective view of the row unit of FIG. 2.
Figure 6:
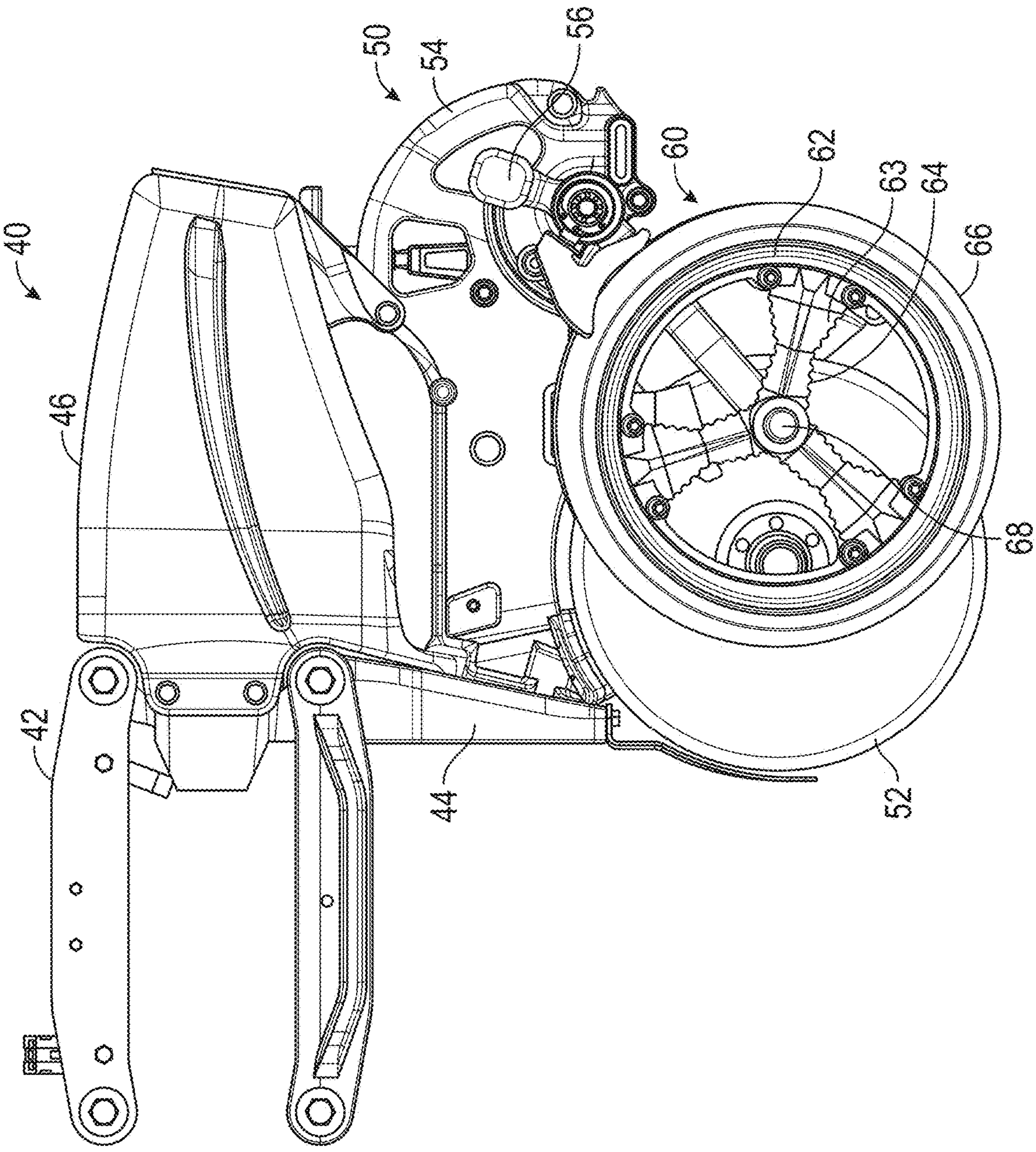
FIG. 6 is a side elevation view similar to FIG. 3 but with some components removed.

An artisan of ordinary skill in the art need not view, within isolated figure(s), the near infinite distinct combinations of features described in the following detailed description to facilitate an understanding of the present disclosure.

DETAILED DESCRIPTION

Unless defined otherwise, all technical and scientific terms used above have the same meaning as commonly understood by one of ordinary skill in the art to which embodiments of the present disclosure pertain.

The terms “a,” “an,” and “the” include both singular and plural referents.

The term “or” is synonymous with “and/or” and means any one member or combination of members of a particular list.

As used herein, the term “exemplary” refers to an example, an instance, or an illustration, and does not indicate a most preferred embodiment unless otherwise stated.

The term “about” as used herein refers to slight variations in numerical quantities with respect to any quantifiable variable. Inadvertent error can occur, for example, through use of typical measuring techniques or equipment or from differences in the manufacture, source, or purity of components.

The term “substantially” refers to a great or significant extent. “Substantially” can thus refer to a plurality, majority, and/or a supermajority of said quantifiable variables, given proper context.

The term “generally” encompasses both “about” and “substantially.”

The term “configured” describes structure capable of performing a task or adopting a particular configuration. The term “configured” can be used interchangeably with other similar phrases, such as constructed, arranged, adapted, manufactured, and the like.

Terms characterizing sequential order, a position, and/or an orientation are not limiting and are only referenced according to the views presented.

The “invention” is not intended to refer to any single embodiment of the particular invention but encompass all possible embodiments as described in the specification and the claims.

The “scope” of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The term “agricultural equipment” encompasses any type of machinery associated with the agriculture industry. For example, both agricultural vehicles and agricultural implements are encompassed by the term “agricultural equipment”.

The term “particulate material” shall be construed to have a broad meaning, and includes, but is not limited to grain, seed, fertilizer, insecticide, dust, pollen, rock, gravel, dirt, stock, or some combination thereof. Particulate material can be mixed with air to form airborne matter.

The present disclosure is not to be limited to that described herein. Mechanical, electrical, chemical, procedural, and/or other changes can be made without departing from the spirit and scope of the present disclosure. No features shown or described are essential to permit basic operation of the present disclosure unless otherwise indicated.

FIG. 1 shows an agricultural implement in the form of an agricultural planter 10 used to plant and fertilize seed in a controlled manner. For example, the planter 10 as shown in FIG. 1 includes a tongue 14, which may be telescoping. The tongue 14 includes a first end 16 with an implement hitch 12 for attaching to a tow vehicle, such as a tractor, prime mover, or other vehicle. The opposite end 18 of the tongue 14 is attached to a toolbar 20. Draft links 22 are shown to be connected between the toolbar 20 and the tongue 14 and are used in conjunction with folding actuators to fold the toolbar 20 in a frontward manner. The tongue 14 may be a telescoping tongue in that it can extend or retract to allow for the front folding of the toolbar 20. The planter 10 may also be a lift and rotate, rear fold, vertical fold, narrow row, or generally any other type of planter.

In addition, as noted, the implement may be a different type of ground engaging implement. For example, agricultural sprayers, plows, tillage equipment, seeders, drills, fertilizers, or other types of implements that can utilize the novel features disclosed herein should be considered a part of the disclosure.

The toolbar 20 includes first and second wings extending generally outwardly therefrom. The toolbar 20 includes central hoppers 24, which contain seed or other granules/particulate used with ground engaging tools, such as seed for planting. A plurality of transport wheels 26 also are connected to the toolbar 20. The first and second wings are generally mere images of one another in mirrored fashion. The wings include first and second wing toolbars, which are essentially extensions from a central toolbar portion. Attached along the toolbar 20 as well as the first and second wing are a plurality of row units 40. When the implement is a planting unit, the row units will include seed meters, ground engaging tools, and/or other components used for planting, tilling, and fertilizing seed in a controlled manner, such as many components that will be described in more detail herein. Also connected to the first and second wings are first and second markers. The markers include actuators, which are used to raise and lower the markers. The markers can be lowered to provide guidance for the edge of a planter for use in planting. When not required, the markers can be lifted to a position as that shown in FIG. 1 to move the markers out of the way.

Also shown in FIG. 1 are a plurality of fans as well as a plurality of wheels 32. The wings may also include actuators to raise and lower or otherwise provide a downward force on the wings. Therefore, as is shown in FIG. 1, there are a multiplicity of components of the planting implement 10. The components may include moving parts, such as the actuators used to move the wings, markers, row units, etc., while also providing additional functions. For example, the fans are used to provide a pressure in the seed meters to aid in adhering seed to a seed disk moving therein. The seed meters may be electrically driven in that a motor, such as a stepper motor, can be used to rotate the seed meters to aid in adhering seed thereto and to provide for dispensing of the seed in a controlled manner for ideal spacing, population, and/or placement. Other features may include actuators or other mechanisms for providing down force to the row units 40. Lights may also be included as part of the planter.

Additionally, an air seed delivery system may be provided between the central hoppers 24 and any plurality of seed meters on the row units 40 in that the air seed delivery system provides a continued flow of seed to the row units on an as needed manner to allow for the continuous planting of the seed via the seed meters on the row units. Thus, the various controls of the planter may require or otherwise be aided by the use of an implement control system. The implement control system can aid in controlling each of the functions of the implement or planter 10 so as to allow for the seamless or near seamless operation with the implement, and also provides for the communication and/or transmission of data, status, and other information between the components.

As will be appreciated, the planter need not include all of the features disclosed herein and may also include additional or alternative features as those shown and/or described. The foregoing has been included as an exemplary planter, and it should be appreciated that generally any planter from any manufacturer and any add-ons or aftermarket components may be included in any planter that encompasses any of the aspects of the invention.

A planter 10 such as that shown can be pulled by the tow vehicle, such as the tractor. In addition, the planter 10 could be pulled by or itself be a self-propelled, autonomous tug unit, rather than an operator-driven vehicle, such as the tractor, such as the one shown and described in co-owned U.S. Pat. No. 10,575,453, which is herein incorporated by reference in its entirety. The rear drivable wheels and front steerable wheels can be substituted for tracks, regardless of whether said tracks are implemented on an operator-driven vehicle or a self-propelled vehicle.

Referring now to FIGS. 2-6, a row unit 40 according to aspects and/or embodiments of the present disclosure, including novel features thereof, is shown. As is appreciated, the row unit 40 may be one of a plurality of row units that are located on a toolbar 20 of a planting implement 10, such as shown in FIG. 1. Generally, each of the row units 40 of a planter 10 may include the same or similar features so that common planting can take place at each of the row units 40 along the toolbar 20 of the planter 10.

In general, the row unit 40 includes a connection linkage 42 connected to a faceplate. The faceplate is attached to the toolbar 20, such as via U-shaped bolts, threaded bolts, screws, clamps, or other mechanical fasteners. The linkage 42 is shown as a four-bar linkage with upper and lower arms that are rotatable at both connected ends. This allows the four arms to be movable to allow the row unit 40 to move vertically relative to the toolbar 20 as the planter 10 moves through a field with varying elevations and undulations.

At a distal end of the linkage is a frame 44, generally comprising metal, and to which many of the components of the row unit 40 may be attached. A housing 46 is shown attached to the frame 44. The housing 46 would at least partially enclose portions of the row unit, such as a seed meter (not shown). The seed meter singulates seed and dispenses the seed, such as via a tube or controlled manner to deliver seed to the ground in a spaced manner, which depends on speed and desired distance between subsequent seed placements.

In addition, as part of the planting, a depth setting system 50 is shown. The depth setting system includes components such as those found in U.S. Ser. No. 17/831,982, the specification, including description and figures of which being incorporated by reference in their entirety. For example, the row unit 40 will include a trench opening member 52, which may be one or more coulter wheels/disks, blades, slots, runners, etc. For the present disclosure, the exact type of furrow opener 52 is not limiting. The major function of seed furrow openers is to create a well-defined groove in the soil where the seed can be placed at the proper depth. However, as soil type, field conditions, moisture, obstructions, row unit weight, and other factors change as a planter moves through a field, it can be difficult to maintain a desired depth throughout the planting process.

Therefore, to aid in attempting to obtain and maintain a desired depth across a field, a depth setting system 50 includes a depth adjustment member 54. This is a lever or actuator that adjusts the position of one or more gauge wheels 60 relative to the furrow openers. For example, linkages will move the gauge wheels to have a lower portion of the furrow openers extend generally lower than the bottom of the gauge wheels 60 to essentially set the depth of the furrow created. The gauge wheels 60 contact the ground to attempt to maintain the depth as the field conditions change.

Still further, a sensor 56 can be included, such as a dog bone as disclosed in the '982 application, which measures the pressure on the gauge wheels. The sensor 56 can take other forms but provides information to the operator to determine if changes to any settings are needed to attempt to maintain the depth created by the furrow openers 52.

Rearward of the depth setting member is a closing assembly. The closing assembly includes closing wheels 58 and setting adjustment portion 59. The closing assembly is used to close the furrow created by the furrow openers 52 after a seed has been placed in the furrow. The closing of the furrow is needed for the seed to be entrapped in the soil to receive nutrients, moisture, and to provide the seed with the best conditions for growing into a crop with the best possible yield. The closing wheels can take many forms and are not to be limited to the depiction shown.

Referring back to the gauge wheels 60, more details will be provided. As noted, the gauge wheels 60 will contact and ride on the field as the planter 10 moves. The gauge wheels 60 can take different forms, but generally include a rim 62 of metal composition to provide the needed structural integrity to operate in the harsh planting conditions. According to the present disclosure, the rim 62 includes one or more spokes 63 extending from the outer rim portion to an axle 68, which is the spinning axis for the gauge wheels 60. Gauge wheels 60 can be spoked or closed. Closed gauge do not generally include an opening through the wheel and are generally used in fields where tilling has occurred to break up trash in the field prior to planting. The spoke gauge wheel is a solution for operators who plant in conditions to allow mud and debris that get caught behind the depth gauge wheel to easily flow through the wheel and continue providing superior depth performance.

Figure 7:
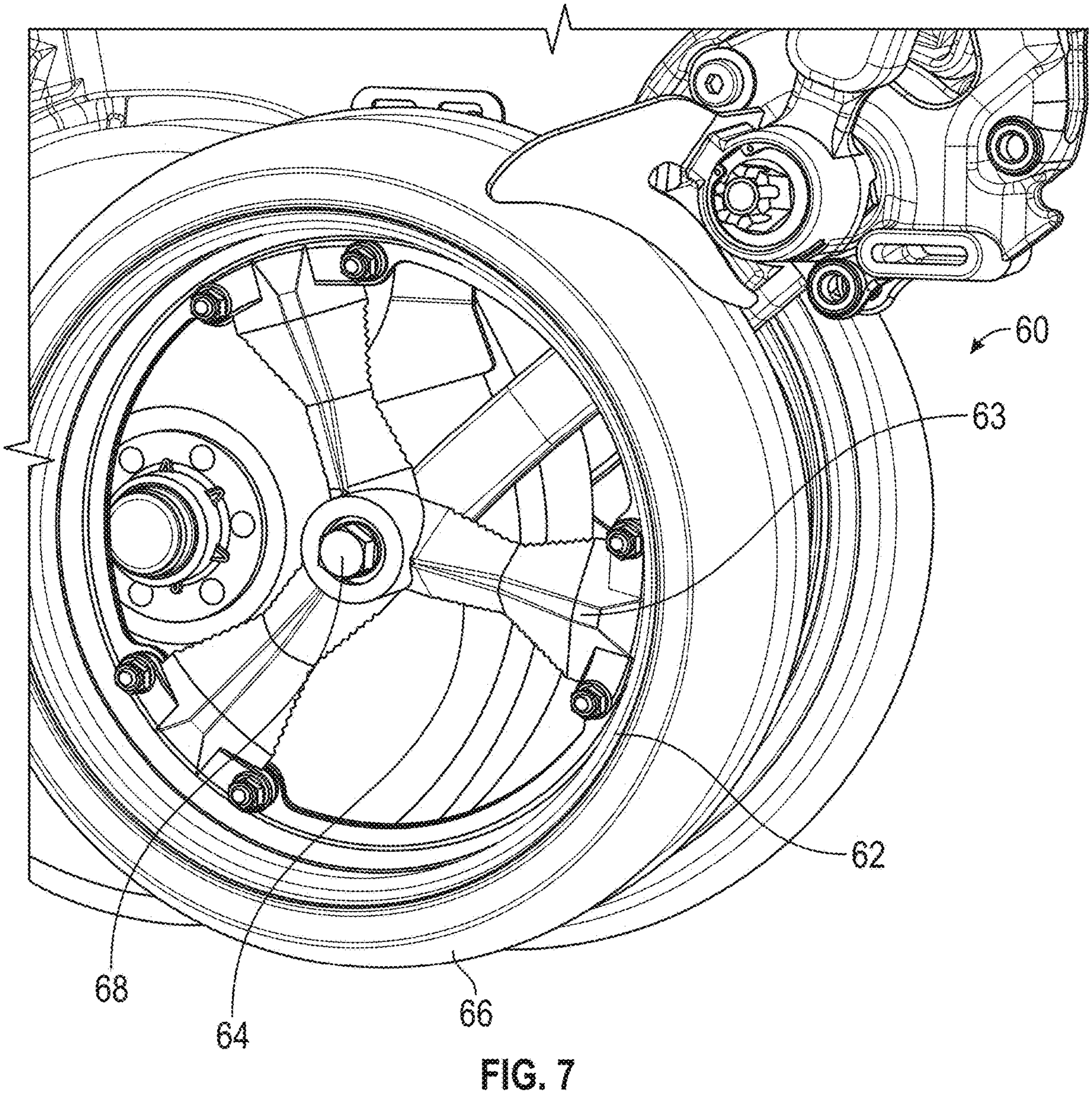
FIG. 7 is a close up of a depth setting system according to aspects and/or embodiments of the present disclosure.

As shown in the figures, and best shown in FIG. 7, the gauge wheel 60 includes three spokes radially spaced about the axis/axle 68 of the wheel. However, the number and/or configuration of the spokes 62 can vary according to need and other considerations, such as field types, trash types, or the like. The spokes 63 and rim 62 can be a cast unit where the components are made together, or the spokes 63 can be mechanically fastened to the rim 62, such as via bolts, screws, clamps, welds, rivets, or the like.

Still further, around the outer periphery (i.e., perimeter) of the rim 62 is positioned a pliable material 66, such as rubber. The rubber or other pliable material 66 provides better traction for the wheel as it moves through the field. In addition, the pliable material 66 may include tracks or other features to further aid in the movement of the row units through the field.

Figure 8:
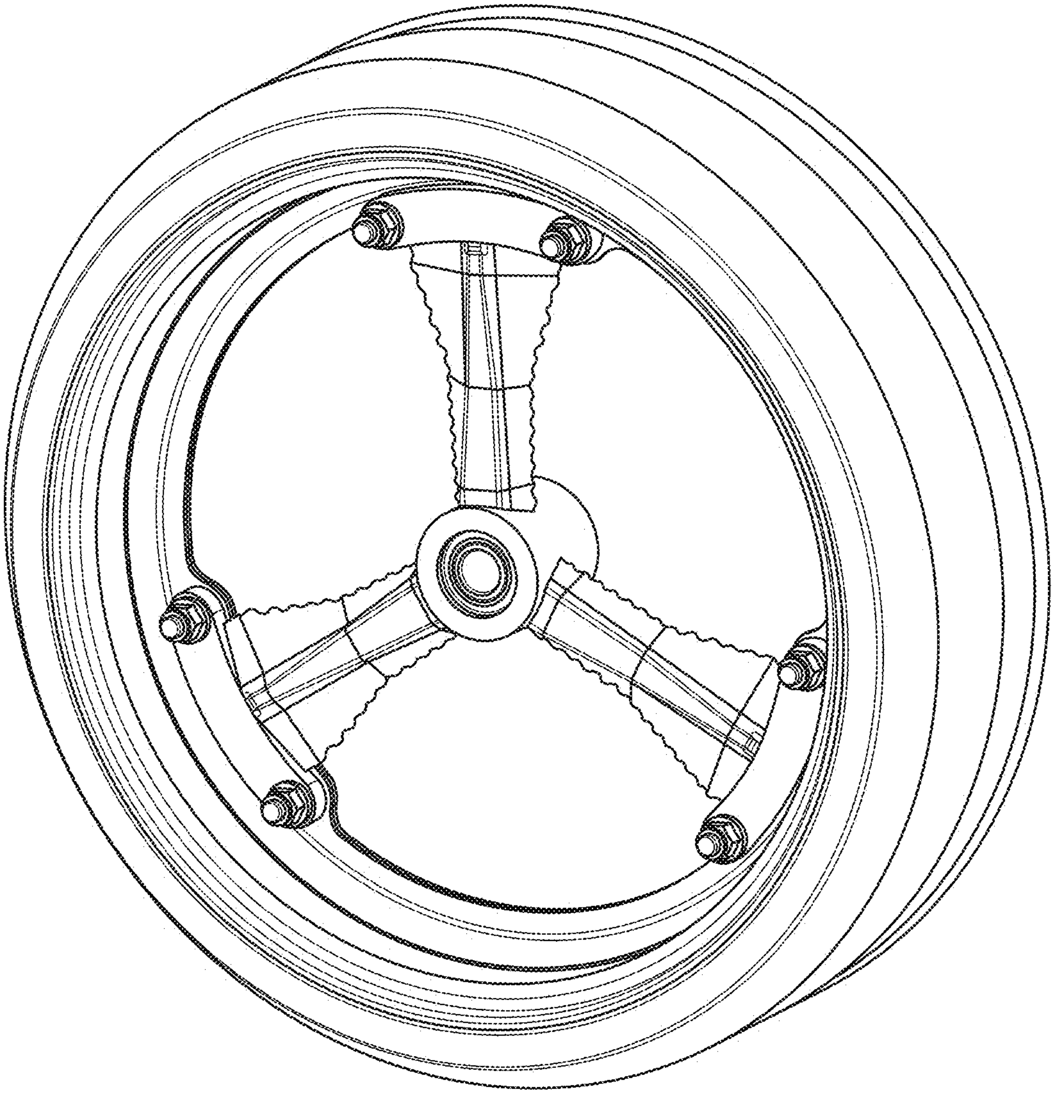
FIG. 8 is a view of a prior art gauge wheel.

A prior art gauge wheel of the type described herein is shown in FIG. 8. As noted, there is a central hub at the axis where the three spokes meet. A connection is made through the hub as the axle for the wheel. The figure shows the spokes bolted to the rim and the rim covered in the rubber material.

However, one drawback to the gauge wheel as shown in FIG. 8 is that it is susceptible to plugging, especially in no-till farming operations. As the stalks, mud, dirt, clods, and other debris (i.e., the trash) starts collecting in the open portions of the rim, more and more will collect until the rim is plugged. At this point, the gauge wheel may be prohibited from spinning or may otherwise not operate in the desired manner. The operator would need to stop operations in order to clean out the gauge wheels, and this downtime delays planting in an already relatively short planting season.

Figure 9:
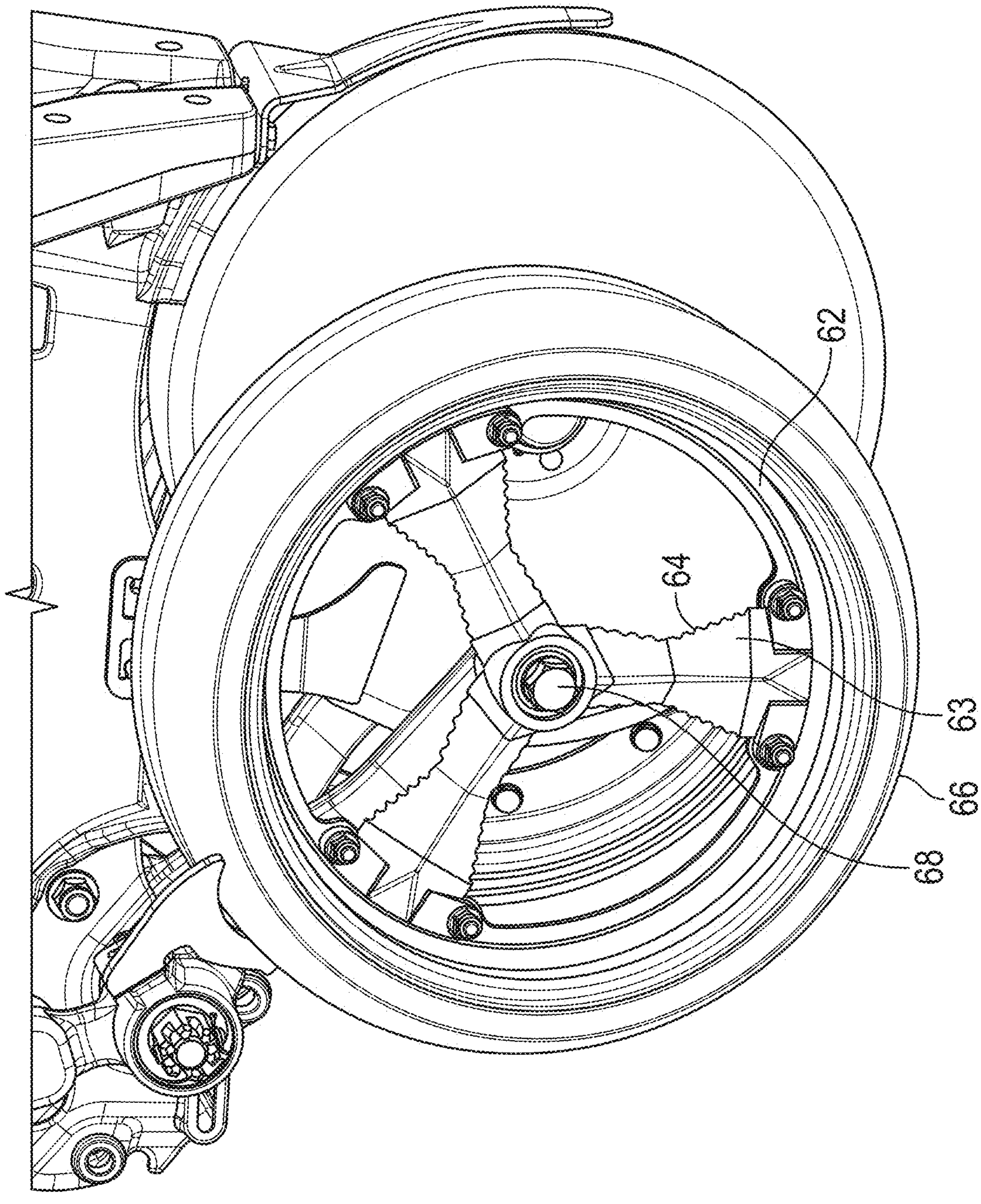
FIG. 9 is a close up view of a gauge wheel with features of the present disclosure.

Therefore, the gauge wheels 60 of the present disclosure include some novel features to aid in mitigating plugging. As shown through the figures, and in detail in FIG. 9, the spokes 63 of the gauge wheels 60 of the present disclosure include serrations 64 along the lengths of the spokes. For example, the serrations 64 may extend along all edges of all of the spokes 63. In alternative embodiments, the serrations 64 may only be added to some edges of some spokes 63.

The serrations 64 may take many forms, but generally are described as jagged or saw-like edges, notched, or toothed, which can aid in the cutting of materials. For example, knives and saws are known to have serrated edges, which aids in their ability to cut materials more efficiently. Likewise, the serrations 64 on the gauge wheels will aid in cutting, chopping, or otherwise handling debris and other trash that may extend through an open portion of the rim of a gauge wheel. The exact type of serration should not be limiting to the disclosure. For example, various types of serrations are considered, including, but not limited to tooth serrations (vertical serrations along the edge of the spokes), wavy serrations, scalloped serration, single edge serrations (serration on one side only for the spokes), double edge serrations (serrations on both sides/edges), fan serrations (side-to-side serration without necessarily having a toothed edge), or even micro-serrations (serrations that are much smaller than the thickness of the spokes to create a fanlike pattern).

The serrations 64 on the spokes 63 of the gauge wheels 60 can be formed in any number of ways, including, but not limited to, casting, forging, pressing, or the like. The serrations could then be treated to sharpen, as desired, using any known sharpening methods.

In operation, the gauge wheels 60 will be rotating at a relatively high speed as the planter moves through the field. Any debris, such as trash, that is in a field, whether tilled or no-till, can be displaced by any number of components of the planter and tow vehicle. Generally, planter row units may include trash cleaners directly in front of the row units to mitigate trash and other debris getting in the way of the furrow being opened and the seed being placed in the furrow. However, this trash may be at the sides of the row unit where the gauge wheels ride and reside. This makes them more susceptible to build up.

However, including the serrated edges of the gauge wheels will address the trash coming into contact with the gauge wheels. The serrations 64 will cut, chop, shear, or otherwise break down the trash and debris as the wheels rotate. This will mitigate plugging of the gauge wheels, which reduces downtime for the operator.

In addition, the breakdown of the trash and other debris via the serrated spokes 63 of the gauge wheels 60 will provide additional benefits. Breaking down the trash can release nutrients in the trash that can make their way back into the soil of the field to aid in the growing of seed. The breakdown will also speed up the increase in organic matter of the soil and can even decrease the need for more herbicides. The breakdown of the organic matter (i.e., trash) can create a layer around the planted seeds to act as a bit of a barrier for weeds and other unwanted vegetation to grow.

Still additional benefits of breaking down the trash with the serrated edges exist. The trash can include stalks and other rigid, organic materials, which can puncture tires of the tow vehicle (tractor) and/or the implement (planter). The serrated spokes 63 of the gauge wheels can aid in breaking down the stalks to lessen the likelihood of tire punctures.

Additional variations may exist. For example, traditional spokes 63 for gauge wheels 60 are generally transverse to the direction of travel and also in a plane that is transverse to the axle of the wheels. However, as the serrated edges 63 are added to shear or otherwise break down the trash and other debris, it is to be contemplated that the spokes themselves could be angled or otherwise pitched relative to the plane of the wheel. For example, the spokes 63 with serrations 64 could be angled inwardly or outwardly relative to the plane of the tire (plane being defined generally as the plane that is 90° to the axle/axis of the wheel), which would aid in directing the trash. In one example, having the spokes angles slightly inward to outward from a front to rear may urge or direct the sheared trash away from the area of the furrow being created, which would aid in mitigating the trash from entering the furrow, which could affect growing conditions for the seed placed therein. It may also be desirable to urge the sheared/broken down trash towards an area of the placed seed, which could be resulted from the spokes being angled outwardly at the front and inwardly at the rear. For example, as has been included, the broken down trash may include nutrients from previous planting seasons. Breaking down the trash may allow the nutrients to reenter the ground, such as around the seed in the furrow. Therefore, it is envisioned that there may be instances wherein the broken down trash, and thus nutrients, may be directed towards the seed to provide improved growing conditions.

To further aid in dealing with trash and other debris, the spoke gauge wheels with the serrated edges may be pitched or angled relative to the direction of travel. For example, in the direction of travel of the planter, the gauge wheels may be angled such that a forward portion are closer together than a rear portion. Such an angled configuration would urge the trash that is broken down by the serrated edges in an outward direction relative to the furrow created. This would mitigate the broken down trash or debris from being directed towards the furrow, which even better protects the seed that has been placed in the furrow. The amount of angle may vary according to desired outcomes but may be between about 1 to about 15-degrees relative to the direction of travel.

Therefore, the use of serrated edges for spokes of gauge wheels has been shown and described. It should be appreciated that not all benefits and/or improvements of such features have been provided, and numerous changes, variations, alternatives, and the like are to be considered part of the present disclosure. For example, the type, style, size, length, etc. of the serrations themselves can be varied to best accomplish the desired outcomes for using the serrated spokes. However, as is understood, the serrated edges of the spokes of the gauge wheels will be a useful improvement that will aid in limiting the amount of downtime required for planting in varying field and weather conditions.

The invention claimed is:

1. An agricultural implement, comprising:

a hitch;

at least one toolbar at a distal end of the hitch, said toolbar extending generally transverse to the hitch; and a plurality of row units operatively connected to the toolbar, each of the plurality of row units comprising a depth setting system comprising a pair of gauge wheels connected to a depth setting member, wherein the pair of gauge wheels each comprise a rim and an outer pliable wheel, with the rim comprising a plurality of spokes with serrations along the spokes.

2. The agricultural implement of claim 1, wherein the rim of each gauge wheel comprises three equally spaced spokes.

3. The agricultural implement of claim 1, wherein the serrations are formed on both sides of the plurality of spokes.

4. The agricultural implement of claim 1, wherein the rim comprises a unitary component with the plurality of spokes and an outer periphery to hold the pliable wheel.

5. The agricultural implement of claim 1, wherein the rim comprises an outer periphery member and the plurality of spokes operably attached to the outer periphery member.

6. The agricultural implement of claim 1, wherein the pliable wheel comprises a rubber material on the periphery of the rim.

7. The agricultural implement of claim 1, further comprising a sensor connected to the pair of gauge wheels and the depth setting member to provide feedback in the form of force applied via the gauge wheels.

8. The agricultural implement of claim 1, wherein the pair of gauge wheels are oriented at an angle relative to a direction of travel for the agricultural implement, with a forward location of the pair of gauge wheels closer to one another than a rear location of the pair of gauge wheels.

9. The agricultural implement of claim 1, further comprising a residue wheel connected to each row unit to aid in breaking up trash prior to the pair of gauge wheels.

10. An agricultural row unit, comprising:

a frame;

a furrow opener; and a depth setting system connected to the frame and furrow opener to control the depth of furrow created by the furrow opener, the depth setting system comprising a pair of gauge wheels comprising a spoked rim with one or more spokes, wherein each of the spokes comprising a serrated edge.

11. The agricultural row unit of claim 10, wherein each of the spokes of the gauge wheel comprises serrations on both sides of the spokes.

12. The agricultural row unit of claim 10, wherein the one or more spokes comprises three, equally spaced spokes about a rotational axis.

13. The agricultural row unit of claim 10, wherein the gauge wheel further comprises a pliable material about the outer periphery of the rim.

14. The agricultural row unit of claim 13, wherein the pliable material comprises rubber.

15. The agricultural row unit of claim 10, further comprising a seed meter connected to the frame.

16. The agricultural row unit of claim 10, further comprising a sensor connected to the pair of gauge wheels and the depth setting member to provide feedback in the form of force applied via the gauge wheels.

17. A depth setting system for an agricultural row unit, comprising:

a furrow opener;

one or more gauge wheels;

a depth setting member connected to the one or more gauge wheels, wherein the depth setting member and the one or more gauge wheels set the depth of furrow created by the furrow opener; and wherein the one or more gauge wheels comprise a rim with one or more spokes, and each of the one or more spokes comprising a serrated edge.

18. The depth setting system of claim 17, wherein the one or more gauge wheels comprise a pair of gauge wheels on opposite sides of the agricultural row unit.

19. The depth setting system of claim 17, wherein the one or more spokes of the rim of the one or more gauge wheels comprise serrations on more than one edge.

20. The depth setting system of claim 17, further comprising a sensor connected to the one or more gauge wheels and the depth setting member to provide feedback in the form of force applied via the one or more gauge wheels.

* * * * *